United States Patent [19]

Nachbur et al.

[11] Patent Number: 4,611,072

[45] Date of Patent: Sep. 9, 1986

[54] HEAT-SENSITIVE RECORDING MATERIAL

[75] Inventors: Hermann Nachbur, Reinach; Christel Tempel, Richen, both of Switzerland

[73] Assignee: Ciba-Geigy Corporation, Ardsley, N.Y.

[21] Appl. No.: 741,330

[22] Filed: Jun. 5, 1985

Related U.S. Application Data

[62] Division of Ser. No. 557,013, Dec. 1, 1983.

[30] Foreign Application Priority Data

Dec. 10, 1982 [CH] Switzerland ........................ 7215/82

[51] Int. Cl.[4] ............................ C07F 3/06; C07F 5/06

[52] U.S. Cl. .................................... 556/135; 556/181; 556/182

[58] Field of Search ..................... 260/448 AD, 429.9; 556/135, 181, 182

[56] References Cited

U.S. PATENT DOCUMENTS

| | | | |
|---|---|---|---|
| 3,055,847 | 9/1962 | Woods et al. | 260/448 AD X |
| 3,205,271 | 9/1965 | Ecke et al. | 260/448 AD X |
| 3,355,504 | 11/1967 | Coffield et al. | 260/448 AD X |
| 3,772,352 | 11/1973 | Rieger | 260/448 AD |
| 3,931,261 | 1/1976 | Strobel | 260/429.9 |
| 3,974,299 | 8/1976 | Crosby et al. | 260/429.9 X |
| 4,005,141 | 1/1977 | Moore et al. | 260/429.9 X |
| 4,113,976 | 9/1978 | Michurov et al. | 260/448 AD X |
| 4,239,699 | 12/1980 | MacKay | 260/429.9 X |
| 4,250,104 | 2/1981 | Giannini et al. | 260/448 AD |

*Primary Examiner*—Helen M. S. Sneed
*Attorney, Agent, or Firm*—Edward McC. Roberts; Meredith C. Findlay

[57] ABSTRACT

A heat-sensitive recording material which comprises in its color reactant system, as developer for the color former, at least one aluminum or zinc phenate of a phenolsulfonyl compound of the formula

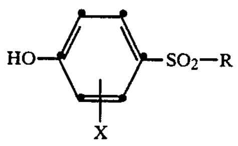

(1)

wherein

R is $C_1$–$C_{12}$alkyl, cycloalkyl, phenyl, benzyl, or phenyl which is substituted by halogen, lower alkyl, lower alkoxy, nitro or methylenedioxy, and X is hydrogen, halogen, lower alkyl or lower alkoxy.

5 Claims, No Drawings

HEAT-SENSITIVE RECORDING MATERIAL

This is a divisional of application Ser. No. 557,013 filed on Dec. 1, 1983.

The present invention relates to a heat-sensitive recording material which contains in its colour reactant system, as developer for the colour former, at least one aluminium phenate, or preferably at least one zinc phenate, of a phenolsulfonyl compound of the formula

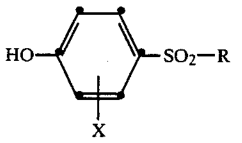

(1)

wherein

R is alkyl of 1 to 12, preferably 1 to 4, carbon atoms, cycloalkyl, phenyl, benzyl, or phenyl which is substituted by halogen, lower alkyl, lower alkoxy, nitro or methylenedioxy; and X is hydrogen, halogen, lower alkyl or lower alkoxy.

The substituents R and X, which occur two or three times both in the zinc and aluminium phenates, may be identical or different. The substituents are preferably identical.

Lower alkyl and lower alkoxy normally denote groups which contain 1 to 5, preferably 1 to 3, carbon atoms. Examples of lower alkyl groups are methyl, ethyl, isopropyl, sec-butyl or tert-butyl; and examples of lower alkoxy groups are methoxy, ethoxy, isopropoxy, n-butoxy or tert-butoxy.

X is preferably halogen, methyl, methoxy, ethoxy or, most preferably, hydrogen.

An alkyl group R may be straight chain or branched. Examples of such alkyl groups are methyl, ethyl, n-propyl, isopropyl, n-butyl, isobutyl, sec-butyl, hexyl, octyl, isooctyl, nonyl, isononyl or dodecyl.

R as cycloalkyl is e.g. cyclopentyl or, preferably, cyclohexyl.

Preferred substituents in the phenyl moiety of the radical R are chlorine, methyl or methoxy. R is preferably phenyl or phenyl substituted by halogen, methyl, methoxy or ethoxy, e.g. chlorophenyl, methylphenyl, dimethylphenyl or methoxyphenyl.

Halogen is e.g. fluorine, bromine or, preferably, chlorine.

Preferred phenolsulfonyl compounds of the formula (1) are those in which R is methylphenyl, methoxyphenyl or preferably phenyl, and X is hydrogen.

The aluminium and zinc phenates of the phenolsulfonyl compounds of the formula (1) constitute a novel class of developers or electron acceptors for colour formers.

The zinc phenates are prepared by reacting 2 moles of a phenolsulfonyl compound of the formula (1) with 1 mole of the zinc salt of an inorganic acid or of a lower aliphatic or aromatic carboxylic acid. The zinc phenates so obtained have the formula

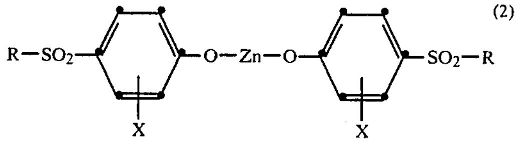

(2)

wherein R and X have the given meanings. The substituents defined for R and X may be identical or different.

The reaction is preferably carried out in a melt or in an alkaline solution of the phenolsulfonyl compound employed, conveniently in the temperature range from 60° to 90° C. and preferably in the presence of an alkali, e.g. a hydroxide, carbonate or bicarbonate of an alkali metal, or ammonium hydroxide, ammonium carbonate or ammonium bicarbonate.

Typical representatives of the phenolsulfonyl compounds employed in the above reaction are:

4-hydroxy-1-methylsulfonylbenzene,
4-hydroxy-1-ethylsulfonylbenzene,
4-hydroxy-1-cyclohexylsulfonylbenzene,
4-hydroxy-1-benzylsulfonylbenzene,
4-hydroxydiphenylsulfone,
4'-nitro-4-hydroxydiphenylsulfone,
2'-nitro-4-hydroxydiphenylsulfone,
4'-chloro-4-hydroxydiphenylsulfone,
4'-fluoro-4-hydroxydiphenylsulfone,
4'-methyl-4-hydroxydiphenylsulfone,
3',4'-dimethyl-4-hydroxydiphenylsulfone,
4'-methoxy-4-hydroxydiphenylsulfone or
4'-n-butoxy-4-hydroxydiphenylsulfone.

The most preferred phenolsulfonyl compounds are 4-hydroxydiphenylsulfone and 4'-methyl-4-hydroxydiphenylsulfone.

Typical examples of inorganic zinc salts are zinc chloride, zinc sulfate or zinc nitrate. Examples of organic zinc salts are zinc diacetate, zinc oxalate, zinc hydrogen benzoate or, preferably, zinc dibenzoate.

Instead of the above zinc salts, it is also possible to use zinc oxide or zinc carbonate, in which case the reaction with the phenolsulfonyl compound is preferably carried out in the presence of ammonium formate.

The aluminium phenates are obtained by condensation of 3 moles of a phenolsulfonyl compound of the formula (1), or an alkali metal salt thereof, with a water-soluble aluminium salt of an inorganic or organic acid.

The preferred procedure comprises reacting 3 moles of a phenolsulfonyl of the formula (1) with the aluminium salt of a lower aliphatic or cycloaliphatic alcohol, preferably a secondary aliphatic or cycloaliphatic alcohol, most preferably with aluminium triisopropylate, aluminium sec-butylate or aluminium cyclohexylate. The aluminium phenates so obtained have the formula

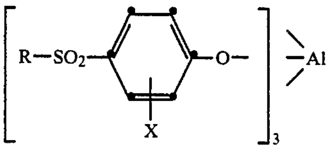

(3)

wherein R and X have the given meanings.

The reaction is conveniently carried out by heating the reactants in the temperature range from 80° to 200° C. and distilling off the lower aliphatic or cycloaliphatic alcohol set free.

Phenolsulfonyl compounds of the formula (1) and the preparation thereof are described e.g. in Beilstein, E II 6, pp. 852–855 and E III 6, pp. 4445–55.

A preferred process for the preparation of the phenolsulfonyl compounds of the formula (1) comprises reacting a compound of the formula

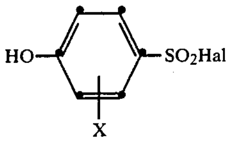
(4)

with a compound RH, or reacting a compound of the formula $$R—SO_2—Hal \qquad (5)$$

with a phenol compound of the formula

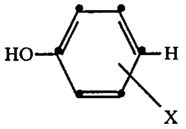
(6)

in which formulae (4), (5) and (6) above X and R have the given meanings and Hal is halogen, e.g. chlorine, bromine or chlorine. The reaction is carried out in anhydrous medium and in the presence of a Lewis acid, e.g. $AlCl_3$, $FeCl_3$, $ZnCl_2$, $SnCl_4$, $SbCl_5$ or $BF_3$, and advantageously in the temperature range from 50° to 200° C., most preferably from 80° to 130° C. A further process comprises heating a compound of the formula

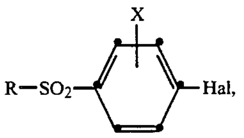
(7)

wherein R, X and Hal have the given meanings, with aqueous potassium hydroxide solution to 200°–220° C.

The aluminium and zinc phenates of the phenolsulfonyl compounds of the formula (1) are virtually colourless and odourless and are very reactive with conventional colour formers, so that spontaneous stable and non-fading copies are obtained.

In particular, the copies obtained with the aluminium and zinc phenates employed in the practice of this invention have excellent stability at temperatures of up to 60° C.

The colour formers suitable for use in the recording or copying material of this invention are known colourless or faintly coloured chromogenic compounds which, on coming into contact with the zinc phenates of the formula (2) or with the aluminium phenates of the formula (3), become coloured or change colour. It is possible to use colour formers, or mixtures thereof, which belong to e.g. the classes of the azomethines, fluoranes, benzofluoranes, phthalides, azaphthalides, spiropyranes, spirodipyranes, leucoauramines, triarylmethaneleuco dyes, carbazolylmethanes, chromenoindoles, chromenopyrazoles, phenoxazines, phenothiazines, as well as chromeno or chromano colour formers.

Examples of such suitable colour formers are: crystal violet lactone (Registered Trademark), 3,3-(bisaminophenyl)-phthalides, 3,3-(bis-substituted indolyl)-phthalides, 3-(aminophenyl)-3-indolyl-phthalides, 3-(aminophenyl)-3-indolylazaphthalides, 6-dialkylamino-2-n-octylaminofluoranes, 6-dialkylamino-2-arylaminofluoranes, 6-dialkylamino-3-methyl-2-arylaminofluoranes, 6-dialkylamino-2- or -3-lower alkylfluoranes, 6-dialkylamino-2-dibenzylaminofluoranes, 6-N-cyclohexyl-N-lower alkyl-3-methyl-2-arylaminofluoranes, 6-pyrrolidino-2-arylaminofluoranes, bis-(aminophenyl)-furyl-, -phenyl- or -carbazolylmethanes, 3'-phenyl-7-dialkylamino-2,2'-spirodibenzopyranes, bis-dialkylaminobenzhydrol-alkyl- or -arylsulfinates, benzoyldialkylaminophenothiazines or benzoyldialkylaminophenoxazines.

Aluminium and zinc phenates of the phenolsulfonyl compounds of the formula (1) are suitable for use as colour developers in a heat-sensitive or thermoreactive recording material. This recording material usually contains at least one carrier, one colour former, one developer and optionally also a binder and/or wax. Thermoreactive recording systems comprise, for example, heat-sensitive recording and copying materials and papers. These systems are used e.g. for recording information, for example in electronic computers, teleprinters or telewriters, or in recording and measuring instruments, e.g. electrocardiographs. The image (mark) formation can also be effected manually with a heated pen. Laser beams can also be used to produce heat-induced marks.

The thermoreactive recording material can be composed such that the colour former is dispersed or dissolved in one binder layer and the developer is dissolved or dispersed in the binder in a second layer. Another possibility consists in dispersing both the colour former and the developer in one layer. By means of heat the binder is softened at specific areas and the colour former comes into contact with the developer at those points where heat is applied and the desired colour develops at once. The aluminium and zinc phenates of the phenolsulfonyl compounds of formula (1) may be used in heat-sensitive recording materials by themselves, as mixtures, or in admixture with known developers.

Typical examples of known developers are activated clays such as attapulgite, acid clay, bentonite, montmorillonite, activated clay, e.g. acid-activated bentonite or montmorillonite, and also zeolith, halloysite, silica, alumina, aluminium sulfate, aluminium phosphate, zinc chloride, zinc nitrate, kaolin or any clay or acidic organic compound, for example unsubstituted or ring-substituted salicylic acid or salicylates and their metal salts, or an acidic polymer, for example a phenolic polymer, an alkylphenolacetylene resin, a maleic acid/rosin resin or a partially or completely hydrolysed polymer of maleic acid and styrene, ethylene or vinyl methyl ether, or carboxypolymethylene.

The aluminium and zinc phenates employed in the practice of this invention can also be used with advantage in combination with metal-free compounds, for example 4-tert-butylphenol, 4-phenylphenol, 4-hydroxydiphenylether, $\alpha$-naphthol, $\beta$-naphthol, 4-hydroxymethylbenzoate, 4-hydroxyethylbenzoate, 4-hydroxy-n-butylbenzoate or, preferably, 4-hydroxybenzylbenzoate, 4-hydroxyacetophenone, 2,2'-dihydroxydiphenyl, 4,4-isopropylidenediphenol, 4,4'-isopropylidene-bis (2-methylphenol), 4,4'-bis(hydroxyphenyl)-valeric acid, hydroquinone, pyrogallol, phloroglucinol, p-, m- and o-hydroxybenzoic acid, gallic acid, 1-hydroxy-2-naphthoic acid, as well as boric acid and organic, preferably aliphatic, dicarboxylic acids, for example tartaric acid, oxalic acid, maleic acid, citric acid, citraconic acid and succinic acid.

It is preferred to use fusible, film-forming binders for the production of the thermoreactive recording material. These binders are normally water-soluble, whereas the colour formers and the developers are insoluble in water. The binder should be able to disperse and fix the colour former and the developer at room temperature.

By applying heat the binder softens or melts, so that the colour former comes in contact with the developer and a colour is able to form. Examples of binders which are soluble, or at least swellable, in water are hydrophilic polymers, such as polyvinyl alcohol, polyacrylic acid, hydroxyethyl cellulose, methyl cellulose, carboxymethyl cellulose, polyacrylamide, polyvinyl pyrrolidone, gelatin, starch or etherified corn starch.

If the colour former and the developer are in two separate layers, it is possible to use water-insoluble binders, i.e. binders which are soluble in non-polar or only weakly polar solvents, for example natural rubber, synthetic rubber, chlorinated rubber, alkyd resins, polystyrene, styrene/butadiene copolymers, polymethylacrylates, ethyl cellulose, nitrocellulose and polyvinyl carbazole. The preferred arrangement, however, is that in which the colour former and the developer are contained in one layer in a water-soluble binder.

The thermoreactive coatings may contain further ingredients. To improve the degree of whiteness, to facilitate the printing of papers, and to prevent the heated pen from sticking, the coatings may contain e.g. talcum, $TiO_2$, ZnO, $CaCO_3$ (e.g. chalk), clays, such as kaolin or also organic pigments, for example urea/formaldehyde polymers or melamine/formaldehyde polymers. In order to effect the colour formation only within a limited temperature range, there may be added substances such as urea, thiourea, diphenyl thiourea, acetamide, acetanilide, stearyl amide, phthalic anhydride, metal chlorides, metal stearates, e.g. zinc stearate, phthalonitrile or other appropriate fusible products which induce the simultaneous melting of the colour former and the developer. Thermographic recording materials preferably contain waxes, e.g. carnauba wax, montan wax, paraffin wax, polyethylene wax, or condensates of higher fatty acids and ethylenediamine.

The invention is illustrated by the following Examples, in which parts and percentages are by weight, unless otherwise indicated.

PREPARATORY EXAMPLES

Example A

With stirring, 23.4 g of 4-hydroxydiphenylsulfone are heated to 145° C. To the resultant melt is added in portions over 50 minutes a mixture of 15.4 g of zinc dibenzoate and 7.9 g of ammonium bicarbonate. The reaction mixture is then stirred for 3½ hours at 150° C., after which time no further evolution of carbon dioxide is observed. The warm melt is poured into a porcelain dish and allowed to cool. The solid is comminuted and suspended in 200 g of deionised water using a mixer. The suspension is filtered and the filter cake is washed with deionised water and dried in vacuo at 60° C., affording 25 g of a pale beige-coloured crude product which constitutes the zinc phenate of the formula (11)

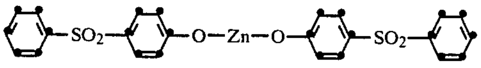

The crude product has a melting point of 160°–225° C. Elemental analysis: 9.6% S; 8.46% Zn.

Example B

With stirring, 35.2 g of 4-hydroxydiphenylsulfone and 10.4 g of aluminium triisopropylate are heated to 150° C. The isopropanol set free is distilled off over 30 minutes, the last traces being removed by a vacuum treatment under 22 mbar. The residual melt is poured into a porcelain dish and allowed to cool. The cold solid is pulverised, affording 34.6 g (95% of theory) of a pale beige-coloured product which constitutes the aluminium triphenate of the formula

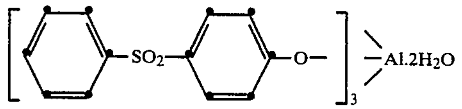

(12)

which melts at 115°–118° C.

Elemental analysis: calc.; C=56.7%; H=4.05%; Al=3.54%; S=12.6%. found; C=56.4%; H=4.35%; Al=3.61%; S=12.1%.

Example C 11.7 g of 4-hydroxydiphenylsulfone are stirred into a solution of 2 g of sodium hydroxide in 150 ml of water over 5 minutes at 70° C. Then a solution of 7.19 g of $ZnSO_4.7H_2O$ (zinc sulfates.7 hydrate) in 50 ml of water are added dropwise to the colourless solution at the same temperature over 15 minutes. The resultant suspension is cooled to 20° C. and filtered, and the filter residue is washed and dried in vacuo at 80° C., affording 13.6 g of a white product which corresponds to the zinc phenate of the formula (11). This product melts at >250° C.

Elemental analysis: 11.7% S; 12.2% Zn.

Example D 10.75 g of 4-hydroxy-4'--chlorodiphenylsulfone are stirred into 40 ml of an aqueous solution of 1N sodium hydroxide and 150 ml of water over 5 minutes at 70° C. Then a solution of 5.75 g of $ZnSO_4.7H_2O$ in 40 ml of water is added dropwise over 15 minutes. The suspension so obtained is filtered, affording 12 g of a white substance of the formula (13)

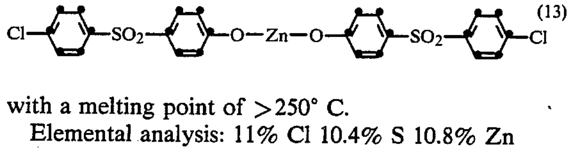

with a melting point of >250° C.

Elemental analysis: 11% Cl 10.4% S 10.8% Zn

Example E 9.92 g of 4-hydroxy-4'-methyldiphenylsulfone are stirred into 40 ml of an aqueous solution of 1N sodium hydroxide and 150 ml of water over 5 minutes at 70° C. Then a solution of 5.75 g of $ZnSO_4.7H_2O$ in 40 ml of water is added dropwise. The suspension so obtained is filtered, affording 11.3 g of a light brown substance of the formula

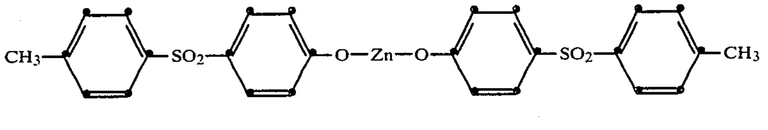
(14)

This zinc phenate has a melting point of >250° C.

Elemental analysis: 10.9% S; 11.4% Zn.

Example F 10.5 g of 4-hydroxy-3',4'-dimethyldiphenylsulfone are stirred into 40 ml of an aqueous solution of 1N sodium hydroxide and 150 ml of water over 5 minutes at 70° C. Then a solution of 5.8 g of $ZnSO_4.7H_2O$ in 40 ml of water is added dropwise over 15 minutes. The suspension so obtained is filtered, affording 11.9 g of a pale beige-coloured substance of the formula

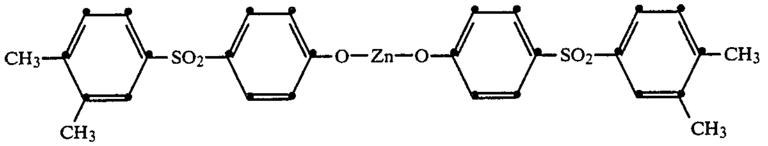
(15)

with a melting point of >250° C.

Elemental analysis: 10.4% S 10.5% Zn.

Example G

With stirring, 12.4 g of 4-hydroxy-4'-methyldiphenylsulfone and 3.5 g of aluminium triisopropylate are heated to 80° C. and then isopropyl alcohol is slowly distilled off. After 40 minutes the residual isopropanol is removed under reduced pressure (23 mbar). The residue is poured warm into a mortar, cooled and pulverised. Yield: 13.8 g of a crude product which is the aluminium triphenate of the formula

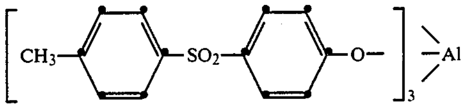
(16)

which melts at 131°-133° C.

Elemental analysis: 3.1% Al; 10.3% S.

Example 1

Two dispersions A and B are first prepared.

Dispersion A is prepared by grinding 8 g of the zinc phenate of 4-hydroxydiphenylsulfone prepared in Example A, 32 g of a 10% aqueous solution of polyvinyl alcohol 25/140, and 20 g of water, in a ball mill to a particle size of 2–4 μm.

Dispersion B is prepared by grinding 1 g of crystal violet lactone, 4 g of a 10% aqueous solution of polyvinyl alcohol 25/140, and 2 g of water, in a ball mill to a particle size of 2–4 μm.

The two dispersions are then mixed.

The colourless mixture is coated with a doctor blade on paper having a weight of 50 g/m$^2$. The coating weight of the mixture is 3 g/m$^2$ (dry weight). The thermographic recording paper so obtained has a colourless surface. A blue color develops rapidly at 80° C., with saturation being reached at about 150° C.

When this coloured sample, which has developed at 150° C., is stored for 1 hour at 58° C., virtually no decrease in colour is visible.

Intense lightfast and stable blue colours can also be obtained by using any of the other colour developers prepared according to Examples B to G.

Example 2

Two dispersions A and B are first prepared.

Dispersion A is prepared by grinding 8 g of the aluminium phenate of 4-hydroxydiphenylsulfone obtained in Example B, 32 g of a 10% aqueous solution of polyvinyl alcohol 25/140, and 20 g of water in a ball mill to a particle size of 2–4 μm.

Disperison B is prepared by grinding 1 g of 2-phenylamino-3-methyl-6-N-cyclohexyl-N-methylamino-fluorane, 4 g of a 10% aqueous solution of polyvinyl alcohol 25/140, and 1.5 g of water, in a ball mill to a particle size of 2–4 μm.

The two dispersions are then mixed.

The colourless mixture is coated with a doctor blade on paper having a weight of 50 g/m$^2$. The coating weight of the mixture is 3 g/m$^2$ (dry weight). The thermographic recording paper so obtained has colourless surface. A black color develops rapidly at 80° C., with saturation being reached at 175°-200° C.

An intense stable black colour can also be obtained by using any of the other colour developers prepared according to Examples A and C to G.

What is claimed is:

1. An aluminum or zinc phenate of a phenolsulfonyl compound of the formula

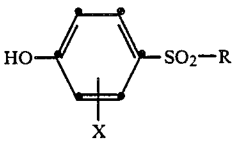
(1)

wherein

R is phenyl, or phenyl which is substituted by halogen, lower alkyl, lower alkoxy, nitro or methylenedioxy, and X is hydrogen, halogen, lower alkyl or lower alkoxy.

2. The aluminium or zinc phenate of claim 1, wherein R is phenyl or phenyl substituted by halogen, methyl, methoxy or ethoxy.

3. The aluminium or zinc phenate of claim 2, wherein R is phenyl, chlorophenyl, methylphenyl, dimethylphenyl or methoxyphenyl.

4. The aluminium phenate of 4-hydroxydiphenylsulfone or 4-hydroxy-4'-methyldiphenylsulfone.

5. The zinc phenate of 4-hydroxydiphenylsulfone or 4-hydroxy-4'-methyldiphenylsulfone.

* * * * *